J. A. WESER.
BRAKE FOR TALKING MACHINES.
APPLICATION FILED JUNE 27, 1916.

1,231,826.

Patented July 3, 1917.
4 SHEETS—SHEET 1.

J. A. WESER.
BRAKE FOR TALKING MACHINES.
APPLICATION FILED JUNE 27, 1916.
1,231,826.
Patented July 3, 1917.
4 SHEETS—SHEET 2.
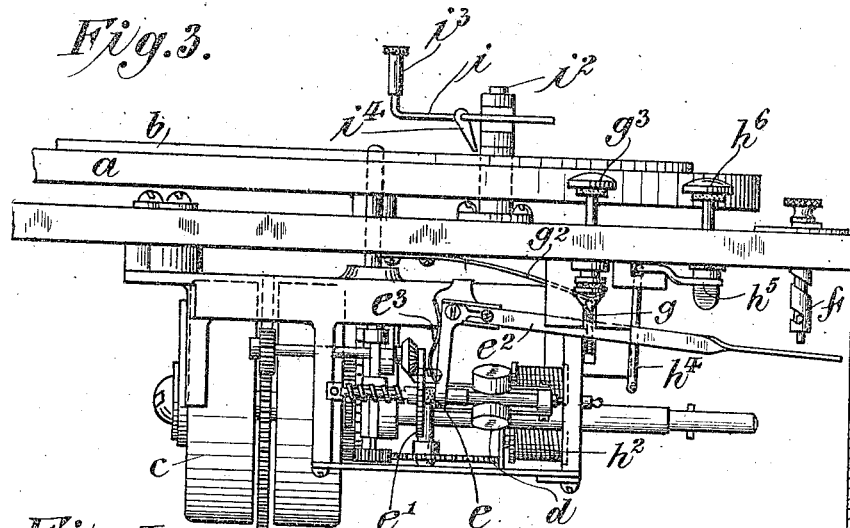
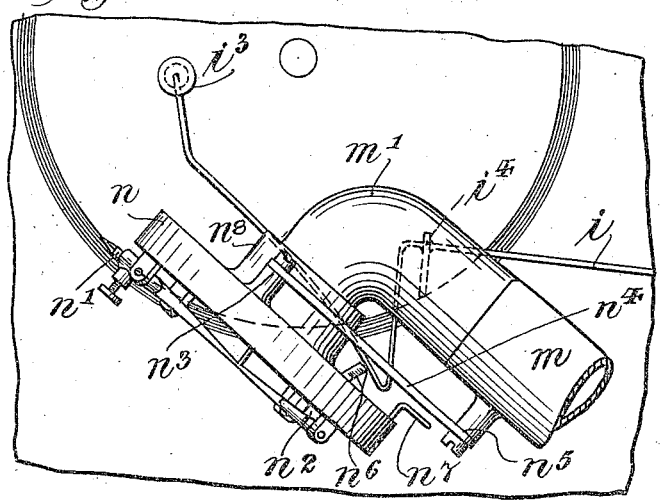
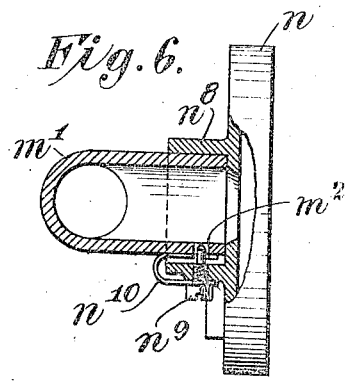
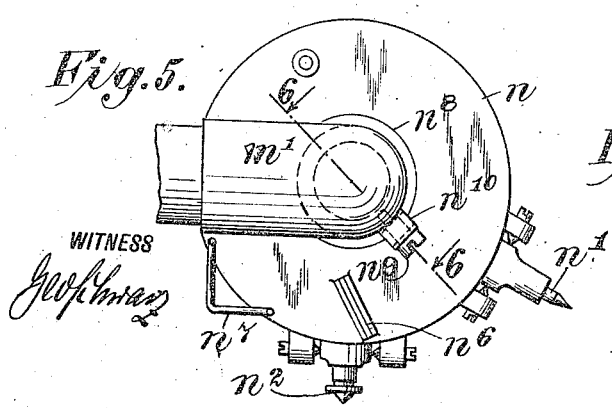
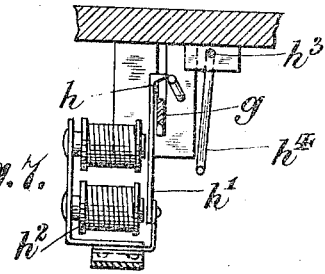
WITNESS
INVENTOR
John A. Weser
BY
Redding, Greeley & Walker
ATTORNEYS J. A. WESER.
BRAKE FOR TALKING MACHINES.
APPLICATION FILED JUNE 27, 1916.
1,231,826.
Patented July 3, 1917.
4 SHEETS—SHEET 3.
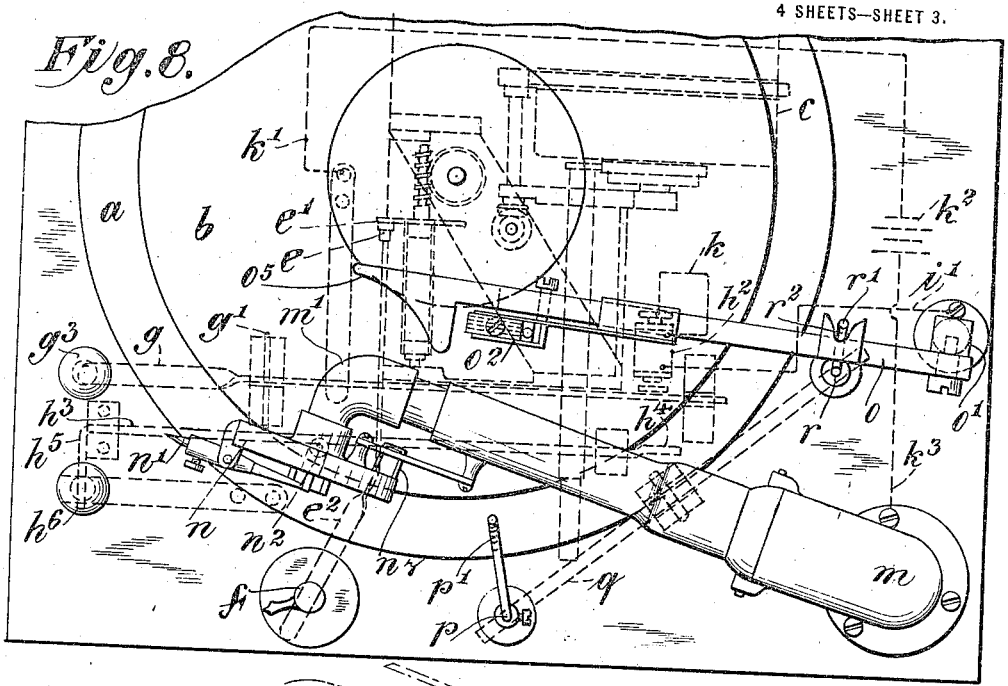
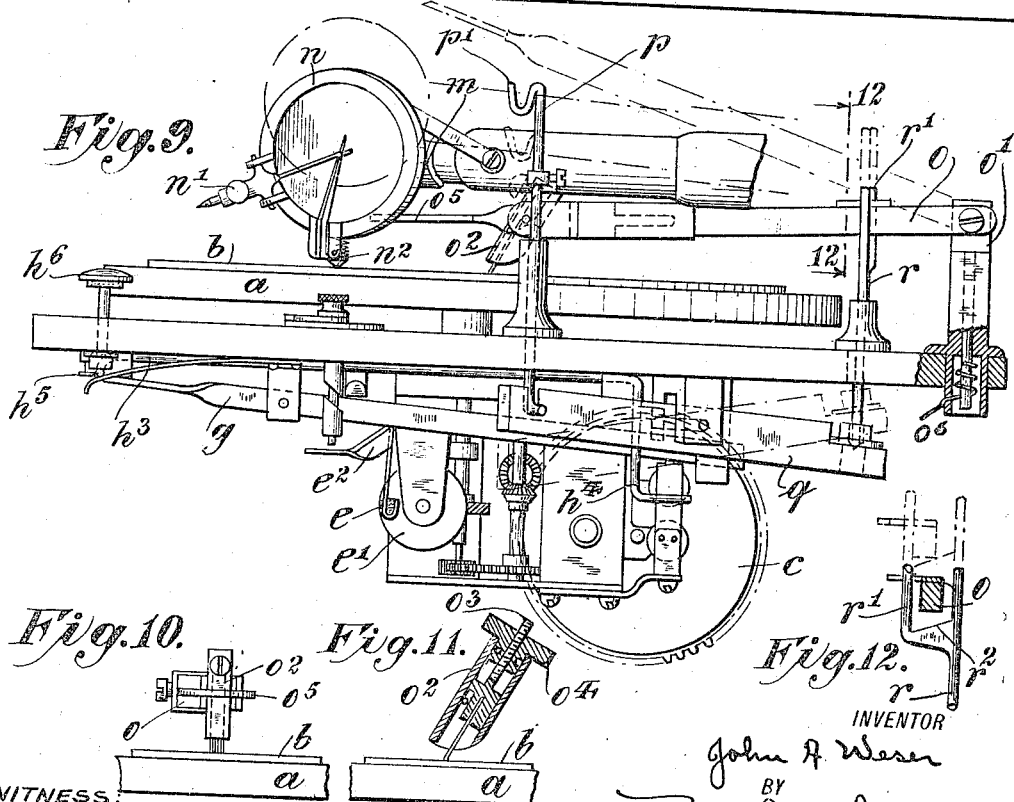
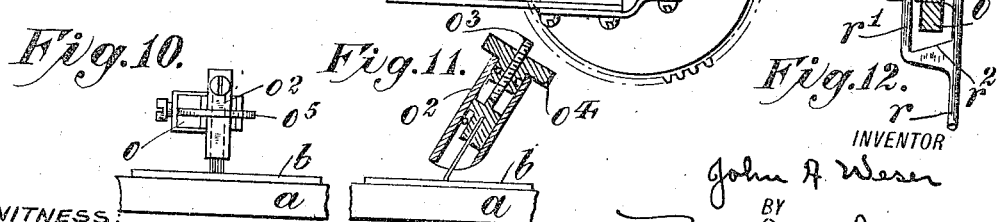

J. A. WESER.
BRAKE FOR TALKING MACHINES.
APPLICATION FILED JUNE 27, 1916.
1,231,826.
Patented July 3, 1917.
4 SHEETS—SHEET 4.
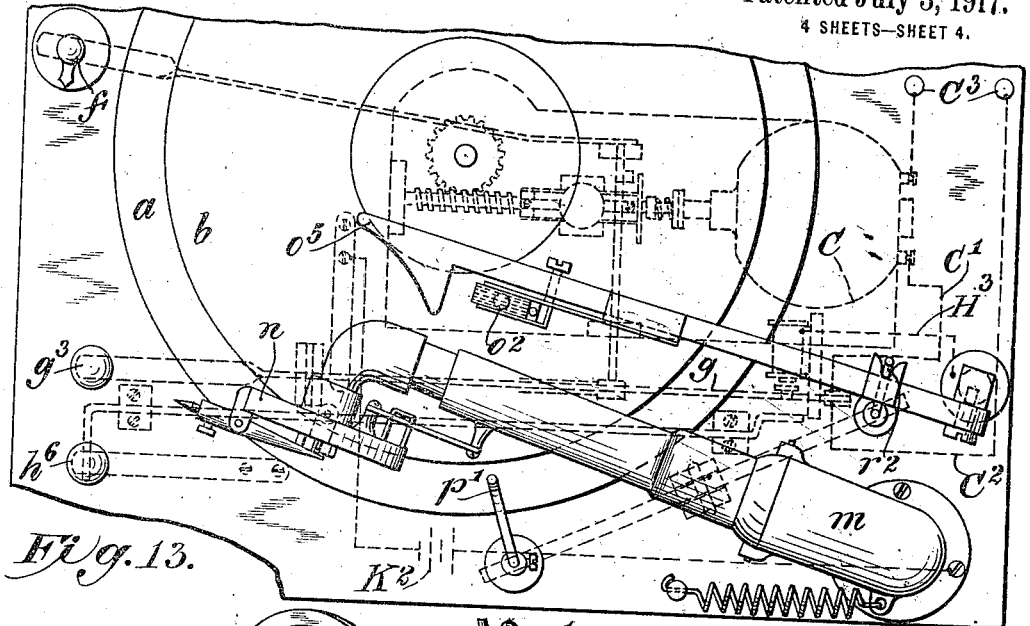
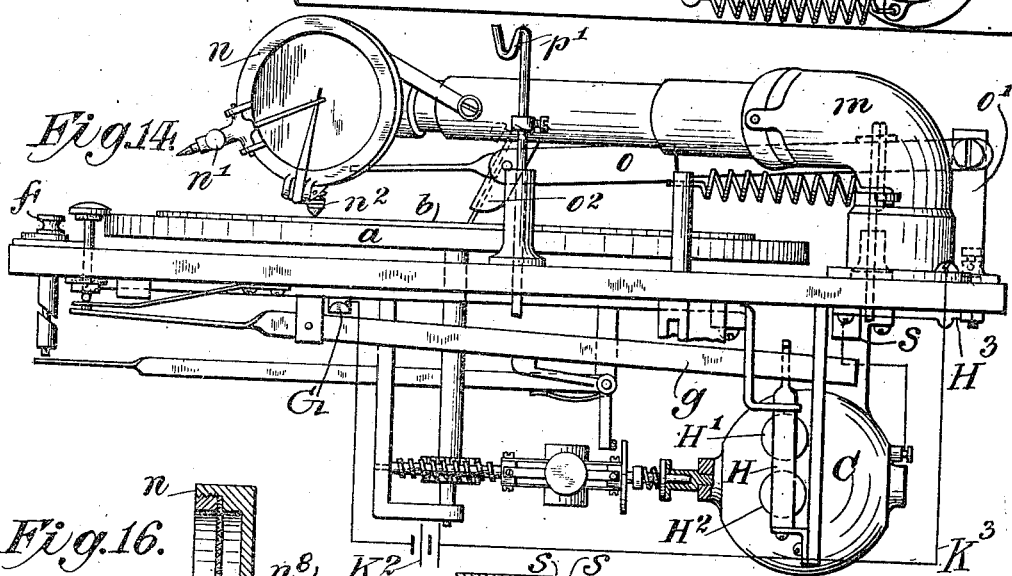
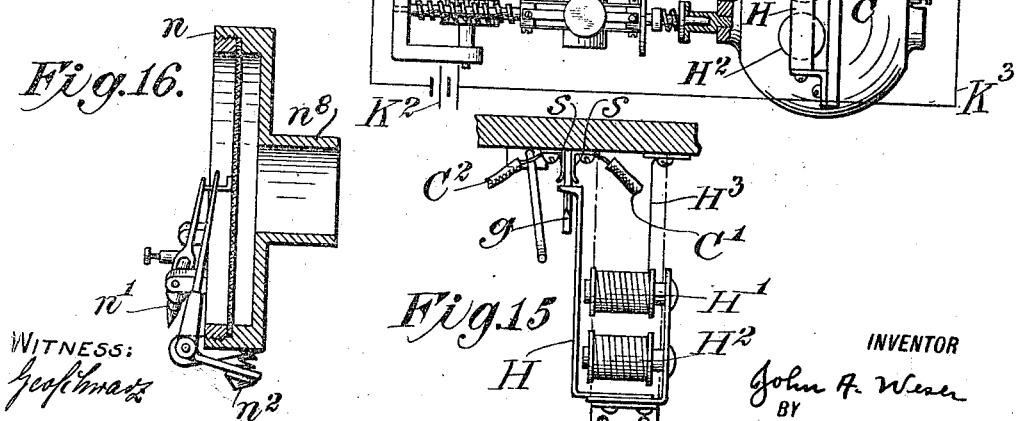
INVENTOR
John A. Weser
BY
ATTORNEYS

UNITED STATES PATENT OFFICE.

JOHN A. WESER, OF NEW YORK, N. Y.

BRAKE FOR TALKING-MACHINES.

1,231,826.  Specification of Letters Patent.  Patented July 3, 1917.

Application filed June 27, 1916. Serial No. 106,099.

*To all whom it may concern:*

Be it known that I, JOHN A. WESER, a citizen of the United States, residing in the borough of Manhattan of the city of New York, in the State of New York, have invented certain new and useful Improvements in Brakes for Talking-Machines, of which the following is a specification, reference being had to the accompanying drawings, forming a part hereof.

This invention relates to talking machines of the disk type and has for its object to improve the construction of such machines in certain details and particularly to provide improved devices for stopping a machine at a predetermined point and particularly when the needle is at or near the end of the record groove. The invention further has to do with an automatic self-finding and stop device which positions itself automatically at the proper place to bring about the stopping of the record at a predetermined point, and with the association with the automatic self-finding device of means to raise this device from the face of the record automatically when the sound box is raised and removed from the record. This automatic finding device which automatically finds the correct stopping place at the end of a record for any kind of disk phonograph records, can be attached to any kind of stopping device for either spring or electrically driven phonographs.

As there is on all records a blank space before the record begins to play, there is a spring attached to the tone arm to force the arm against the playing part of the record. When it is placed on the blank space, this prevents setting it in the grooves as it automatically glides to the grooves at the beginning of a record. There is also a blank space at the end of each record disk. The finder arm automatically drops on the blank space when the tone arm is positioned to play a record. The finder arm is assisted by a light spring and with the revolving of the record it automatically forces the finder arm against the end of the record grooves and remains there until the tone arm has also reached the end of the record when contact between the two is made and a magnet energized to stop the operation.

The invention will be more fully explained hereinafter with reference to the accompanying drawings in which it is illustrated, and in which—

Fig. 3 is a view of the same in elevation as seen from the left hand in Fig. 1, a portion of the casing being indicated in section.

Fig. 4 is a detail top view on a larger scale, showing particularly the devices connected with the tone arm and sound box.

Fig. 5 is a view in side elevation, as seen from the rear, of the sound box with a portion of the tone arm.

Fig. 6 is a detail view partly in section on the plane indicated by the line 6—6 of Fig. 5, looking in the direction of the arrows.

Fig. 7 is a detail view showing particularly the electromagnet and its immediately associated parts for stopping the machine.

Fig. 8 is a partial view, similar to Fig. 1, but showing a slightly modified embodiment of the invention.

Fig. 9 is a partial view in side elevation of some of the parts shown in Fig. 8.

Figs. 10–12 are details to be referred to.

Fig. 13 is a view similar generally to Fig. 8 but showing a talking machine in which an electric motor is used in place of a spring motor for driving the turn-table.

Fig. 14 is a fragmentary view in side elevation of some of the parts shown in Fig. 13.

Fig. 15 is a detail view showing the electromagnet and its associated parts for breaking the circuit of the magnet and the actuating motor.

Fig. 16 is a view in vertical section of a modified form of sound box.

Except as hereinafter indicated, the talking machine to which, in the accompanying drawings, the present improvements are applied, is of substantially ordinary construction. It comprises the rotating turn-table $a$ on which the record disk $b$ is placed as usual, a motor $c$ provided with a governor $d$ and a brake $e$ arranged to bear against a brake disk $e'$ on the governor shaft, for controlling the starting, the stopping and the speed of the motor and the turn-table, the brake $e$ being carried, as usual, by a right angled brake lever $e^2$ which is acted upon by a light spring $e^3$ to move the brake away from the brake disk. The speed controlling device $f$, of ordinary character, is arranged to bear on the long arm of the brake lever $e^2$ for the purpose of regulating the pressure of the brake $e$ against the brake disk $e'$, when the machine is in operation, thereby regulating the speed of rotation of the turn-table.

Figure 2:
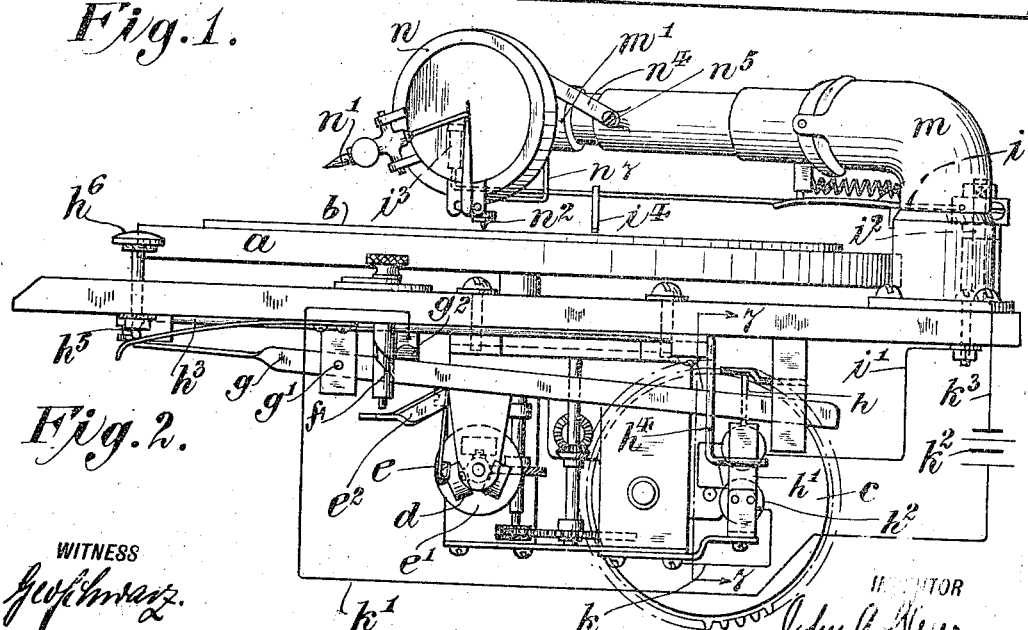
Fig. 2 is a view of the same in elevation, as seen from below in Fig. 1.

Overlying the brake lever $e^2$ transversely is a stopping and starting lever $g$, which is pivoted at $g'$, and has its longer arm acted upon by a spring $g^2$ which acts normally to press the longer arm downward, as shown in Fig. 2. Downward movement of the longer arm of the lever $g$ presses downward the horizontal arm of the brake lever $e^2$ and therefore presses the brake $e$ against the brake disk $e'$ to stop the machine, while a lifting of the longer arm of the lever $g$ relieves the brake lever $e^2$ from pressure and permits the spring $e^3$ to move the brake lever so as to withdraw the brake from the brake disk for starting, the continuing pressure of the brake against the disk, and therefore the speed of the machine, being regulated by the speed regulating device $f$.

The short arm of the stopping and starting lever is subjected to the action of a starting and resetting plunger $g^3$, by which the lever may be moved against the pressure of the spring $g^2$ and the action of gravity to release the brake lever $e^2$ and at the same time to reset the lever $g$ in position for release either by hand or by the automatic stopping devices now to be described.

The lever $g$ is normally held in the running position by a latch $h$, controlled by the armature $h'$ of an electromagnet $h^2$. The armature $h'$ may be moved by hand to disengage the latch and release the lever $g$, by means of a bell crank lever $h^3$ having one arm $h^4$ adapted to bear against the armature $h'$ and another arm $h^5$ adapted to be actuated by a spring supported plunger $h^6$.

For automatic stopping, the circuit of the magnet is closed and the magnet energized by devices which act at a predetermined time or when the needle is at or near the end of the groove of the record.

Figure 1:
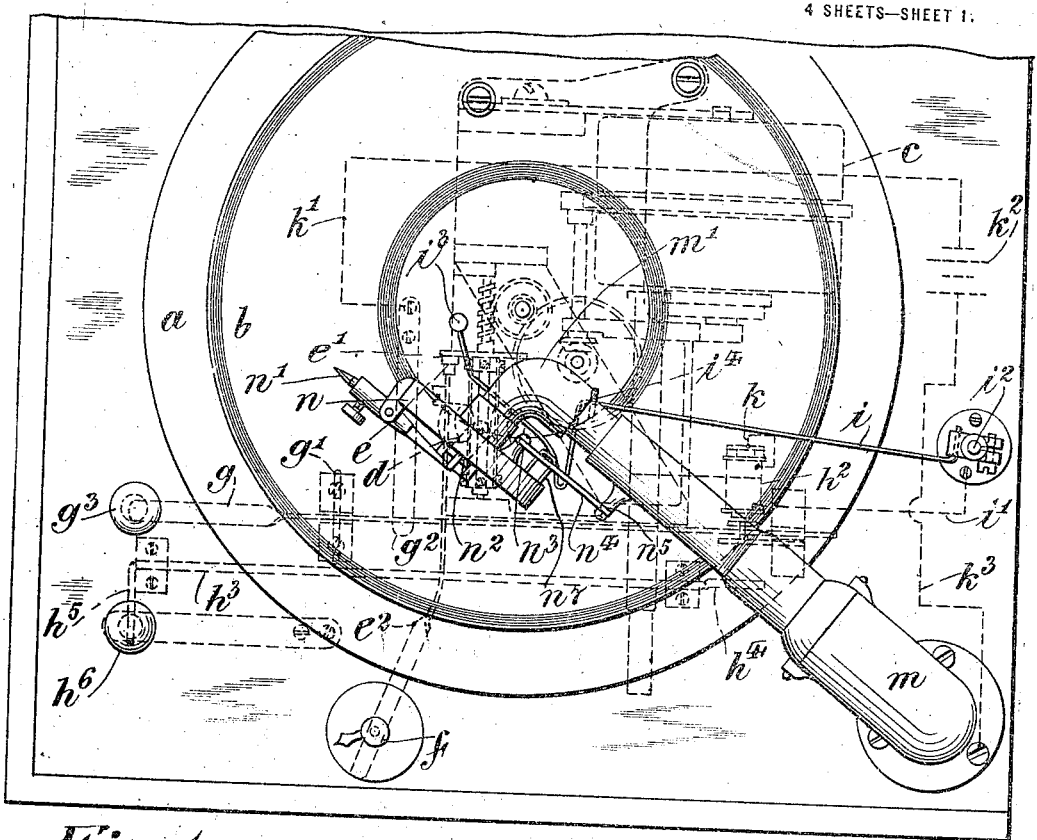
Figure 1 is a top view of a talking machine equipped with the improvements.

The coils of the magnet are connected on one side, as indicated in Fig. 1, through a connection $i'$ and a swiveled support $i^2$, with a movable contact arm $i$. The latter is provided with a handle $i^3$ by which the position of the contact arm may be changed as desired, and with an indicating finger $i^4$ which is held normally just above the record disk.

On the other side the coils of the magnet are connected through a wire $k$ with the frame of the magnet to which the latch $h$ is attached and thence to the lever $g$ through the spring $g^2$ by a wire $k'$ to the battery $k^2$, and thence by a wire $k^3$ to the tone arm $m$ and a terminal carried thereby for contact with the contact arm $i$, when the tone arm, in its horizontal movement, reaches a position where the needle carried by the sound box thereof is at or near the end of the groove of the record disk.

The tone arm is mounted for movement and is constructed in the usual manner. At its extremity it receives an elbow $m'$ which is movable longitudinally with respect to the tone arm and carries, rotatable on its outer end, the sound box $n$.

In order that the machine may be used with record disks of either of the standard types, that is, with the sound wave impressions made vertically or laterally, the sound box is provided with two needles, the one, $n'$, for use with records in which the sound impressions are made laterally, and the other, $n^2$, for use with records in which the sound impressions are made vertically. To bring one or the other of the needles $n'$ $n^2$ into operative position, the sound box must receive a partial rotation about its axis and at the same time its position with respect to the axis of support of the tone arm must be changed, that is, the sound box must be moved longitudinally with respect to the tone arm. To accomplish this result the sound box has pivoted thereto, as at $n^3$, a link $n^4$, the other end of which is pivoted, as at $n^5$, to the tone arm $m$, so that as the sound box is rotated on the end of the elbow $m'$, the elbow itself is moved longitudinally on the end of the tone arm, whereby the correct position of the needle for either type of records is assured.

The contact arm $i$, preferably bent as shown in Fig. 1, is arranged for contact with either of two terminals $n^6$ and $n^7$ carried by the sound box on its rear face, such terminals corresponding respectively to the needles $n'$ and $n^2$, so that which ever needle is in playing position, contact will be made and the circuit closed through the magnet $h^2$ whenever that needle is at or near the end of the groove of the record disk or in such other position as is predetermined.

As soon as the circuit is closed by the described means the magnet $h^2$ is energized, the armature $h'$ is attracted and the latch is operated to release the starting and stopping lever $g$ which then moves to the position shown in Fig. 2, bearing down upon the brake lever $e^2$ and causing the brake $e$ to be pressed against the brake disk $e'$ to stop the machine.

In the embodiment of the invention thus far described the contact arm $i$ stands in a fixed position and the circuit is closed and the machine stopped when the contact or terminal carried by the tone arm reaches the predetermined position of the terminal on the contact arm. In Figs. 8, 9 and 10 is illustrated a slightly different embodiment of the invention in which the contact arm $o$ swings in a horizontal plane and is caused to move automatically in one direction or the other toward its proper position for contact with the tone arm at the predetermined time, thereby constituting an automatic finder which need not be positioned by the attendant. The arm $o$ is hinged on a vertical spindle $o'$ and carries near its free end an adjustable brush $o^2$, the details of construction of which are illustrated most clearly in Fig. 11. The brush proper is mounted in a rectangular open ended frame and is provided with a threaded shank $o^3$ with which coöperates a thumb nut $o^4$ carried in the frame, whereby the brush may be raised or lowered as will be evident. The contact end of the arm $o$ is formed with a curved face $o^5$, the form of which is such that the contacts $n^6$ and $n^7$ on the sound box can contact therewith only when the tone arm has assumed a predetermined angular position with respect to the arm $o$, thereby insuring against the accidental stoppage of the motor through the premature engagement of the tone arm and the contact arm. Of course, the shape of the curve on the face $o^5$ will depend also upon the distance between the axes of rotation respectively of the tone arm and the contact arm, but these axes having once been determined, the face $o^5$ can be shaped readily so that stoppage of the motor will be brought about only when the two arms are in predetermined relationship, that is, only when the needle has reached the desired point on the record. The construction of the arm $o$, it will be evident, is such that when it is permitted to swing freely, it might be dropped by the operator at any point on the record, whether on the smooth portion thereof or on the grooves, and would be impelled by contact with the record to a point directly over the innermost groove. To this extent, the arm may be said to position itself automatically for stoppage of the record at the desired predetermined point. By placing the tone arm on the hook $p$, the automatic finder arm $o$ is automatically lifted and thrown into its initial position beyond the playing position of the records and the flexible brush $o^2$ falls on the blank central part of the record, but eccentrically to the center thereof. As the record disk revolves the centrifugal force, assisted by a light spring $o^6$, forces the brush against the grooves and as the record grooves are spiral in opposition, the contact lever $o$ remains therein until the sound box extensions make the contact at the end of a selection and stop the record in the manner described. The contact arm $o$ also has a yielding holder which holds the guide brush or pin. This permits an adjustment of the brush with relation to the record and, being of flexible material, precludes the transmission of any sound by its contact with the revolving record. However, the improved construction illustrated in Figs. 8 and 9 goes further and provides coöperating means for raising the contact arm $o$ from the record when the sound box is raised therefrom for replacement of a disk. These devices comprise the vertically disposed rest or supporting rod $p$, which is mounted near the edge of the turn-table $a$ and preferably has its upper end hooked, as at $p'$, to receive and support the tone arm when the latter is raised from the record and placed on the hook. The lower end of the rod $p$ engages a lever $q$, the other end of which supports a vertically disposed rest rod $r$, the upper end of which is formed with a fork $r'$ to receive loosely the contact arm $o$, as indicated clearly in Fig. 12. From this description, it will be evident that when the tone arm is placed on the hook $p'$, the rod $p$ will be forced downward vertically, thereby rocking the lever $q$ and simultaneously raising the rod $r$ with the contact arm $o$. In this way the latter is automatically raised from the face of the record whenever the disk is to be replaced. A further feature resides in the provision of a cam face $r^2$ in the fork $r'$ which engages the contact arm $o$ whenever the latter is raised from the table and impresses a lateral pressure thereon sufficient to swing the arm to its initial position. When the brush $o^2$ of the arm $o$ rests on the face of the disk and the tone arm is out of engagement with the hook $p'$, the lever $q$, under the influence of gravity, or a spring, permits the forked rod $r$ to drop vertically to a position well below the arm $o$ and have free lateral movement therein, as will appear from Fig. 12.

As a convenient means for securing the sound box $n$ rotatably on the end of the elbow $m$, the hub $n^8$ of the sound box is provided with a screw pin $n^9$ which enters a circumferential slot $m^2$ in the elbow, whereby the necessary rotary movement of the sound box is permitted within determined limits. A friction spring $n^{10}$, U-shaped, as shown in Fig. 6, and secured by the screw pin $n^9$ to the hub $n^8$, bears against the elbow $m'$ to give the necessary frictional resistance.

The modified construction shown in Figs. 13–15 is identical in all essential details with the embodiments heretofore described, except that there is employed as a prime mover an electric motor C in place of the spring motor $c$. The distinctive feature of this construction resides in the provision of a separate circuit for the electric motor C which is led through the spaced yielding contact members $s$ for the knife switch or starting lever $g$. As indicated clearly in Fig. 15 one lead C' of the motor circuit is connected to one of the clips $s$, while the other lead C² is connected to the other clip. In this way, it will be evident that the motor circuit is controlled primarily by the starting lever or switch $g$ which, when introduced between the clips $s$, completes the motor circuit and is held in raised position by the armature H of the electromagnets H', H², during the playing of the record. The circuit for the magnets H', H² is also completed through the starting lever $g$ and spring terminal G and armature H. The spring terminal G is in the circuit of the battery K² which is grounded conveniently, as through the lead K³ on the tone arm. The magnets H', H² are connected in series and grounded as through the lead H³ on the finder arm. The circuit of the motor C is preferably made through lighting mains, connections to which are indicated conventionally at C³. From the description given, it will be evident that when the tone arm makes contact with the finder arm the local circuit of the magnets H', H² will be made, the starting lever $g$ having been set previously in the manner hereinbefore described. After the magnets are energized, the armature H will be attracted so as to release the starting lever $g$ and it may drop under the influence of gravity and the spring terminal G from the position out of the clips $s$, $s$, thereby interrupting the circuit of the motor C and breaking its engagement with the armature H. Immediately upon the interruption of the circuit of the motor C rotation of the turn-table will be stopped. Simultaneously, interruption of the circuit of the magnets will break the circuit of the battery K², thereby leaving this circuit dead in spite of the continued engagement of the tone arm with the finder arm until subsequent resetting.

It will be understood that various changes in details of construction and arrangement may be made to suit different conditions of use and that the invention is not restricted to the precise arrangement shown and described herein.

I claim as my invention:—

1. In a talking machine, the combination of a motor, a turn table driven thereby, stopping devices for the motor, a tone arm, an electromagnet to control the stopping devices, an electric circuit including the magnet and a source of electric energy, a terminal contact therefor carried with the tone arm, a contact arm constituting the other terminal and mounted movably on the machine, and a finger carried by said arm and adapted to rest on the record disk and to engage the groove thereof to cause automatically swinging movement of the contact arm to its proper position for engagement with the tone arm.

2. In a talking machine, the combination of a motor, a turn table, a brake lever for the motor, a stopping lever normally free of the brake lever but adapted to actuate the same to stop the machine, a latch to hold the stopping lever in operative position, an electromagnet to disengage the latch and release the stopping lever, a normally open electric circuit including a magnet, and devices actuated by the movement of the tone arm to close the circuit and thereby to energize the magnet and release the stopping lever and break the circuit.

3. In a talking machine, the combination of a motor, a turn table, a brake lever for the motor, a stopping lever normally free of the brake lever but adapted to actuate the same to stop the machine, a latch to hold the stopping lever in inoperative position, an electromagnet to disengage the latch and release the stopping lever, a normally open electric circuit including a magnet, a tone arm, a contact terminal carried by the tone arm, and a second terminal with which the first terminal is brought into contact by the movement of the tone arm.

4. In a talking machine, the combination of a motor, a turn table driven thereby, a tone arm, an independent swinging arm pivoted at a distance from the tone arm, devices carried by the swinging arm to coöperate with the record disk and move the swinging arm automatically to a predetermined position and means for stopping the motor, the operation of which is initiated by contact of the tone arm with the swinging arm.

5. In a talking machine, the combination of a motor, a turn table driven thereby, stopping devices for the motor, a tone arm, an electromagnet to control the stopping devices, an electric circuit including the magnet and a source of electric energy, a terminal contact carried with the tone arm, a contact arm constituting the other terminal and provided with a contact face of such form as to be engaged by the terminal on the tone arm only when the two arms are in predetermined relative positions and devices carried by the contact arm to coöperate with the record disk and move the swinging arm automatically to such predetermined position.

6. In a talking machine, the combination of a motor, a turn table driven thereby, a tone arm, an independent swinging arm pivoted at a distance from the tone arm, means for stopping the motor, the operation of which is initiated by contact with the swinging arm, and means adapted to be engaged by the tone arm for moving the swinging arm automatically away from the record grooves when the latter is to be removed from the turn table.

7. In a talking machine, the combination of a motor, a turn table driven thereby, a tone arm, an independent swinging arm pivoted at a distance from the tone arm, means for stopping the motor, the operation of which is initiated by contact of the tone arm with the swinging arm, and means adapted to be engaged by the tone arm for raising the swinging arm automatically from the face of the record disk when the latter is to be removed and simultaneously moving the swinging arm to an initial predetermined position with respect to the record disk to be played.

8. In a talking machine, the combination of a motor, a turn table driven thereby, a tone arm, an independent swinging arm pivoted at a distance from the tone arm, means for stopping the motor, the operation of which is initiated by contact of the tone arm with the swinging arm, a movable support to hold the tone arm in raised position and means operatively connected to said support and actuated by the engagement of the tone arm therewith for raising the swinging arm automatically from the face of the disk.

9. In a talking machine, the combination of a motor, a turn table driven thereby, a tone arm, an independent swinging arm pivoted at a distance from the tone arm, means for stopping the motor, the operation of which is initiated by contact of the tone arm with the swinging arm, a vertically disposed movable support provided with a hook adapted to be engaged by the tone arm in raised position, a lever with which the support is engaged, and a second vertically disposed movable support for the swinging arm engaged with the other end of the lever, whereby depression of the first named support raises the second named support with the swinging arm.

10. In a talking machine, the combination of a motor, a turn table driven thereby, a tone arm, an independent swinging arm pivoted at a distance from the tone arm, means for stopping the motor, the operation of which is initiated by contact of the tone arm with the swinging arm, a vertically disposed movable support provided with a hook adapted to be engaged by the tone arm in raised position, a lever with which the support is engaged, and a second vertically disposed movable support for the swinging arm engaged with the other end of the lever, a fork formed on the other end of the second named support to receive the swinging arm and provided with a cam surface for engagement with the swinging arm, whereby when the second named support is raised, the swinging arm is raised from the face of the record disk and simultaneously swung to an initial predetermined position with respect to the record to be played.

11. In a phonograph, a finder arm movable to operative position by centrifugal force upon rotation of the disk and means to throw said finder arm to initial position toward the center of the record.

12. In a phonograph, in combination with the tone arm, a finder arm movable automatically under the action of centrifugal force into operative position upon rotation of the record disk and means operable by the tone arm for raising the finder arm and moving it automatically into initial position toward the center of the record in readiness for playing.

13. In a phonograph, an automatic finder arm and means controlled by the finder arm for stopping the record disk, said finder arm being movable automatically from any part of the record to a position to effect the stoppage at the end of the record.

14. In a phonograph, a spring tensioned electrified tone arm tensioned toward the beginning of a playing record, an electrified opposing spring tensioned finder arm tensioned toward the end of a player record and adapted to be positioned by the revolving of the record to contact with the tone arm at a predetermined time, and a controlling circuit closed by such contact to stop the record.

This specification signed this 23d day of June A. D., 1916.

JOHN A. WESER.